United States Patent
Sato

(10) Patent No.: US 7,252,483 B2
(45) Date of Patent: Aug. 7, 2007

(54) METHOD OF MANAGING TIME, AT WHICH MAINTENANCE IN A GAS COMPRESSOR MULTIPLE SYSTEM SHOULD BE CARRIED OUT

(75) Inventor: Kazuaki Sato, Yokohama (JP)

(73) Assignee: Anest Iwata Corporation, Yokohama (JP)

( * ) Notice: Subject to any disclaimer, the term of this patent is extended or adjusted under 35 U.S.C. 154(b) by 420 days.

(21) Appl. No.: 10/845,475

(22) Filed: May 12, 2004

(65) Prior Publication Data
US 2004/0258533 A1 Dec. 23, 2004

(30) Foreign Application Priority Data
May 15, 2003 (JP) .............................. 2003-137435

(51) Int. Cl.
*F04B 49/00* (2006.01)
*F04B 41/06* (2006.01)

(52) U.S. Cl. .............................. 417/53; 417/12; 417/2; 417/5

(58) Field of Classification Search .................. 417/53, 417/2, 3, 4, 5, 12, 426; 702/45, 50, 114, 702/138, 140, 177, 184, 182, 183, 187
See application file for complete search history.

(56) References Cited

U.S. PATENT DOCUMENTS 6,266,952 B1 * 7/2001 Choroszylow et al. ........ 60/783
6,419,454 B1 * 7/2002 Christiansen .................. 417/4

OTHER PUBLICATIONS

Karassik, I. J., Messina, J. P., Cooper, P., Heald, C. C., Pump Handbook, McGraw Hill, New York, 2001, 3rd ed., pp. 12.16-12.18.*

* cited by examiner

*Primary Examiner*—Anthony D. Stashick
*Assistant Examiner*—Jessica L Frantz
(74) *Attorney, Agent, or Firm*—Fulwider Patton LLP

(57) ABSTRACT

The method of managing time M, at which maintenance of a gas compressor multiple system incorporating therein a plurality of gas compressors should be carried out, involves making a comparison between a value of M and a predetermined time N for necessary maintenance to carry out the maintenance when the value of M is larger than or substantially equal to a value of N, where M is equal to the product of the operating time T of the system, the average load factor L, and a safety factor C.

5 Claims, 3 Drawing Sheets

US 7,252,483 B2

METHOD OF MANAGING TIME, AT WHICH MAINTENANCE IN A GAS COMPRESSOR MULTIPLE SYSTEM SHOULD BE CARRIED OUT

RELATED APPLICATIONS

This application claims priority from Japanese Patent Application No. 2003-137435, filed May 15, 2003.

BACKGROUND OF THE INVENTION

1. Field of the Invention

The present invention relates to a method of managing time, at which maintenance in a gas compressor multiple system incorporating therein a plurality of gas compressors should be carried out.

2. Description of Related Art

Time, at which maintenance in a gas compressor multiple system should be carried out, that is, time, during which operation is possible until maintenance is carried out, is conventionally managed on the basis of an operating time of the gas compressor multiple system. However, such method of management involves such unreasonableness that specifically in the case where a plurality of gas compressors incorporated in a gas compressor multiple system are low in load factor, a difference between an operating time of each gas compressor and an operating time of the gas compressor multiple system becomes large and maintenance is carried out although an operating time of each gas compressor has not yet reached one, for which maintenance should be essentially carried out.

Therefore, maintenance is increased in number of times as compared with that number of times, which is essentially necessary, and operation and stoppage of gas compressors for maintenance are also increased in number of times, so that there is a fear that a utilization plan of a compressed air on a side of a user is hindered.

Further, large ranges are in some cases caused among gas compressors with respect to a difference between an operating time, in which actual maintenance is carried out in each gas compressor, and an operating time, in which maintenance should be essentially carried out.

In addition, no known document is found to describe management of time, at which maintenance of a gas compressor multiple system should be carried out, in view of load factors of a plurality of gas compressors incorporated in the system.

SUMMARY OF THE INVENTION

In view of the above present circumstances, the invention has, instead of simply managing time, at which maintenance in a gas compressor multiple system should be carried out, on the basis of an operating time of the gas compressor multiple system, its object to adopt load factors of a plurality of gas compressors incorporated in the gas compressor multiple system as elements at the time of calculation of time, at which maintenance should be carried out, to thereby make time, at which maintenance of the gas compressor multiple system should be carried out, as close as possible to time, at which maintenance of the gas compressors incorporated in the system should be essentially carried out, and to make the ranges among the gas compressors with respect to time, at which maintenance should be carried out, as small as possible to thereby average the same.

According to the invention, the above problems are solved by the following method.

A method of managing time, at which maintenance in a gas compressor multiple system should be carried out, the method comprising using the following formula to find an operating time M for management of time, at which maintenance of the gas compressor multiple system incorporating therein a plurality of gas compressors should be carried out, and making a comparison between a value of M and a predetermined time N for necessary maintenance to carry out the maintenance when the value of M is larger than or substantially equal to a value of N.

Formula $M = T$ (operating time of a gas compressor multiple system)$\times L$ (average load factor of a plurality of gas compressors)$\times C$ (safety factor)

DETAILED DESCRIPTION OF PREFERRED EMBODIMENTS

A method of managing time, at which maintenance should be carried out, according to the invention has a feature in using the following formula (1) to find an operating time M for management of time, at which maintenance of a gas compressor multiple system incorporating therein a plurality of gas compressors should be carried out, and making a comparison between a value of M and a predetermined time N for necessary maintenance to carry out the maintenance when the value of M is larger than or substantially equal to a value of N.

$M = T$ (operating time of a gas compressor multiple system)$\times L$ (average load factor of a plurality of gas compressors)$\times C$ (safety factor)      Formula (1)

An average load factor L of the plurality of gas compressors is found by the use of the following formula (2).

$L = S$ (total operating time of a plurality of gas compressors incorporated in a gas compressor multiple system)/[$P$ (number of gas compressors incorporated in a gas compressor multiple system)$\times T$ (operating time of a gas compressor multiple system)]      Formula (2)

The following measures are preferably adopted to determine a total operating time of a plurality of gas compressors incorporated in the gas compressor multiple system. That is, operation control of the gas compressors is performed by a method, in which gas compressors having substantially the same capacity are used for a plurality of gas compressors incorporated in a gas compressor multiple system, a range between predetermined lower and upper limits of pressure is divided into pressure levels, the number of which is the same number as that of the gas compressors as used, the number of gas compressors being operated is changed when the pressure measurement signal gets out of a range of a target pressure level to reach a boundary of each pressure level, and starting and stoppage of the gas compressors keeping with such change are performed in a predetermined order of starting and stoppage, and the total operating time is determined on the basis of data as obtained as a result.

Figure 1:
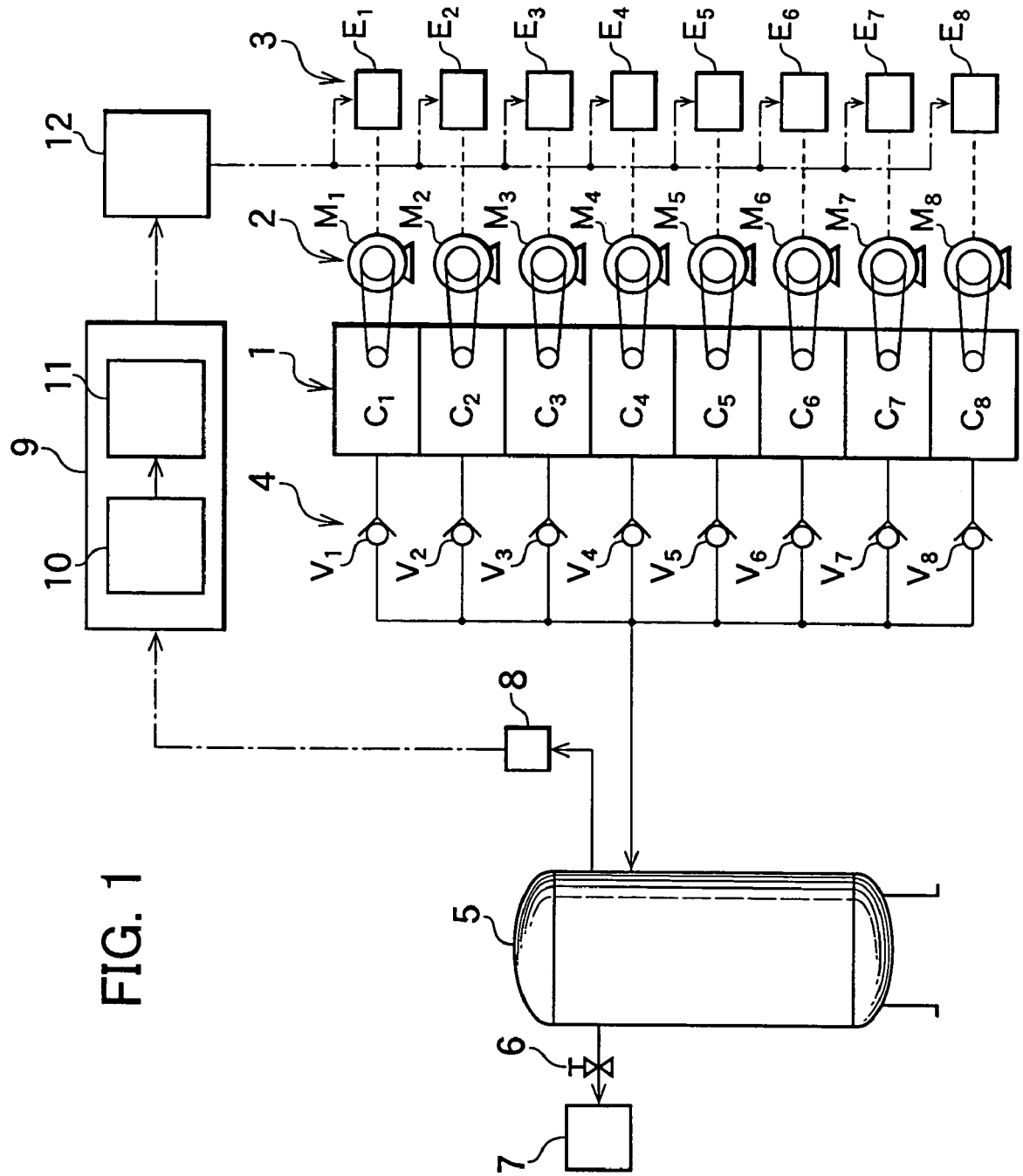
FIG. 1 is a view of a gas compressor multiple system incorporating therein a plurality of gas compressors which is used to perform operation control of the gas compressors.
Figure 2:
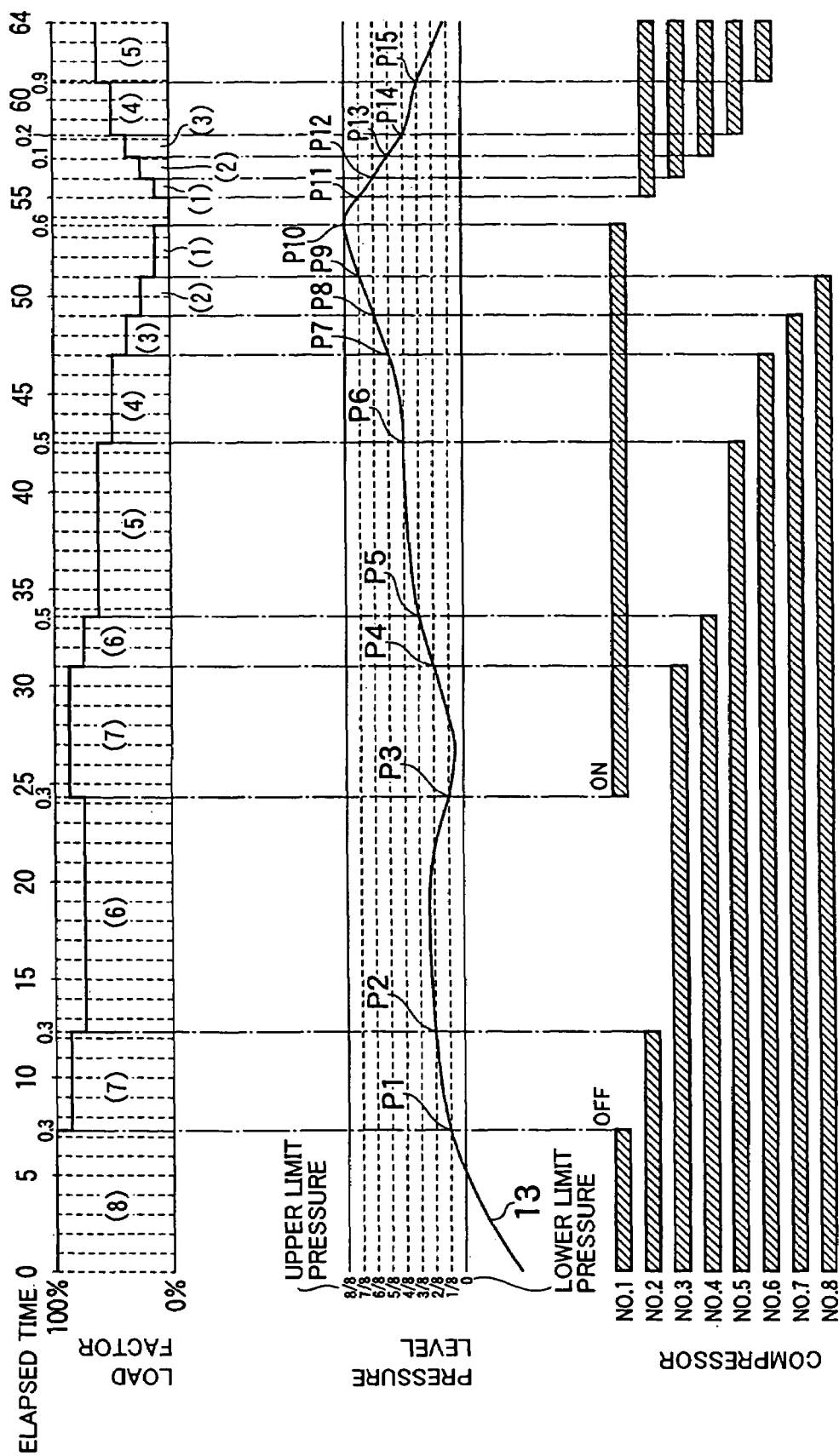
FIG. 2 is a view illustrating a method of finding an average load factor of a plurality of gas compressors in order to apply the invention to the gas compressor multiple system shown in FIG. 1 to manage time, at which maintenance should be carried out.

FIG. 1 is a view of a gas compressor multiple system incorporating therein eight gas compressors which is used to perform operation control of the gas compressors and FIG. 2 is a view illustrating a method of finding an average load factor of the eight gas compressors in order to apply the invention to the gas compressor multiple system shown in FIG. 1 to manage time, at which maintenance should be carried out. In FIG. 2, the number in a round bracket in an uppermost view means the number of operating gas compressors.

In an embodiment shown in FIG. 1, a gas compressor multiple system 1 incorporates therein eight gas compressors $C_1, C_2, \ldots C_8$ having substantially the same capacity. The eight gas compressors $C_1, C_2, \ldots C_8$, respectively, are driven by separate motors 2 ($M_1, M_2, \ldots M_8$) and an electric current to these respective motors, respectively, is sent or interrupted by separate electromagnetic switches 3 ($E_1, E_2, \ldots E_8$).

Check valves 4 ($V_1, V_2, \ldots V_8$) are mounted at outlets of the respective gas compressors $C_n$ (n=1 to 8) to prevent a compressed gas (a compressed air is described below to typify the compressed gas), which is output from the gas compressors $C_n$ (n=1 to 8), from counterflowing.

The compressed air having passed through the check valves 4 is collectively filled in a pressure tank 5, and a quantity of compressed air required by a supplied destination 7 is taken out from the pressure tank 5 by means of opening and closing operations of a valve 6.

Control that maintains the compressed air at a desired pressure in the pressure tank 5 is performed by carrying out feed-back of measurements of pressure of the compressed air in the pressure tank 5 and controlling the operation of the eight gas compressors $C_n$ (n=1 to 8).

A pressure sensor 8 measures pressure of the compressed air in the pressure tank 5 and a measurement signal is transmitted to a control unit 9.

The control unit 9 comprises a unit 10 that determines the number of gas compressors being operated, and a unit 11 that selects a gas compressor or compressors being started up or stopped.

The unit 10 that determines the number of gas compressors being operated determines which one or ones out of the eight gas compressors $C_n$ (n=1 to 8) should be operated, on the basis of a pressure measurement signal of the compressed air in the pressure tank 5, which is measured by the pressure sensor 8. Generally, the number of gas compressors being operated is determined depending on which level between predetermined lower and upper limit values is a pressure measurement signal.

In a concrete, preferred embodiment, gas compressors having substantially the same capacity are used for the eight gas compressors $C_n$ (n=1 to 8), a range between predetermined lower and upper limit values is divided into pressure levels, the number of which is the same as that of the gas compressors $C_n$ (n=1 to 8) being used, and there is adopted a method of changing the number of gas compressors being operated when the pressure measurement signal gets out of a range of a target pressure level to reach a boundary of levels.

That is, when a pressure measurement signal tends to rise and reaches a boundary of a pressure level higher by one stage than a range of a target pressure level, 1 is subtracted from the number of gas compressors, which are operated at present, to determine a new number of gas compressors being operated.

On the other hand, when a pressure measurement signal tends to fall and reaches a boundary of a pressure level lower by one stage than a range of a target pressure level, 1 is added to the number of gas compressors, which are operated at present, to determine a new number of gas compressors being operated.

A signal representative of the number of gas compressors determined in the unit 10 that determines the number of gas compressors being operated is transmitted to the unit 11 that selects a gas compressor or compressors being started up or stopped. The selection unit 11 determines which one or ones out of the eight gas compressors $C_n$ (n=1 to 8) should be started up or stopped.

This determination is performed according to a predetermined order of starting and stoppage. In a preferred embodiment, consecutive numbers are assigned to the eight gas compressors $C_n$ (n=1 to 8) and starting and stoppage, respectively, are performed in the order of the consecutive numbers.

Thus, by performing starting and stoppage in the order of the consecutive numbers, all the eight gas compressors $C_n$ (n=1 to 8) are started up or stopped on average and so it is possible to avoid a disadvantage that only a particular gas compressor or compressors are frequently started up or stopped and put in an operating state over a long period of time.

When a gas compressor or compressors being started up or stopped are selected in the selection unit 11, such signal is transmitted to an operation unit 12.

The operation unit 12 transmits a signal to the electromagnetic switch or switches 3 corresponding to the selected gas compressor or compressors to operate the electromagnetic switch or switches 3 to send or interrupt an electric current to the corresponding motor or motors 2, thus starting up or stopping the gas compressor or compressors selected in the selection unit 11.

As shown in FIG. 2, a range between a lower limit value (for example, 0.6 MPa) and an upper limit value (for example, 0.7 MPa) of the compressed air in the pressure tank 5 is divided into eight stages, the number of which is the same as that the gas compressors $C_n$ (n=1 to 8) to prescribe pressure levels. More specifically, the lower limit value makes 0 level and the upper limit value makes 8/8 level, a range between which is evenly divided to make 1/8, 2/8, ... 7/8 levels. Also, a target pressure level is assumed to be one, for example, between 1/8 and 2/8. Also, No. 1 to No. 8 in this order are assigned to the eight gas compressors $C_n$ (n=1 to 8).

As shown in the figure, all the eight gas compressors 1 are first operated until a measurement signal 13 of that compressed air in the pressure tank 5, which is measured by the pressure sensor 8, reaches the pressure level 1/8. The load factor at this time is 100% at the pressure level 8/8.

When pressure rises and the pressure level passes a lower limit pressure 0 to reach the pressure level 1/8 (P1), a stoppage command signal from the control unit 9 is transmitted via the operation unit 12 to the electromagnetic switch S1 of the No. 1 gas compressor C1 to stop the operation thereof. The remaining seven gas compressors No. 2 to No. 8 continue to be operated. The load factor at this time is 87.5% at the pressure level 7/8. 7.3 hours has elapsed since the beginning of first operation.

When the compressed air is not used, pressure rises and the pressure level reaches the pressure level 2/8 (P2), a stoppage command signal from the control unit 9 is transmitted via the operation unit 12 to the electromagnetic switch S2 of the No. 2 gas compressor C2 to stop the operation thereof. The remaining six gas compressors No. 3 to No. 8 continue to be operated. The load factor at this time is 75% at the pressure level 6/8. 12.3 hours has elapsed.

Next, when the compressed air is not used, pressure rises a little, the compressed air is used and the pressure level falls to reach the pressure level 1/8 (P3) before reaching the next pressure level 3/8, an operation command signal from the control unit 9 is transmitted via the operation unit 12 to the electromagnetic switch of the No. 1 gas compressor, which has first stopped, to start up the gas compressor. Accordingly, the seven gas compressors No. 1 and No. 3 to No. 8 continue to be operated. The load factor at this time is 87.5% at the pressure level 7/8. 24.3 hours has elapsed.

Next, when the compressed air is used, the pressure level does not reach 0 although it falls, thereafter the gas compressor is not used and the pressure level exceeds the pressure level 1/8 again to reach the pressure level 2/8 (P4), a stoppage command signal from the control unit 9 is transmitted via the operation unit 12 to the electromagnetic switch S3 of the No. 3 gas compressor C3 to stop the operation thereof. Accordingly, the six gas compressors No. 1 and No. 4 to No. 8 continue to be operated. The load factor at this time is 75.5% at the pressure level 6/8. 31 hours has elapsed.

Next, when the compressed air is not used, pressure rises, and the pressure level reaches the pressure level 3/8 (P5), a stoppage command signal from the control unit 9 is transmitted via the operation unit 12 to the electromagnetic switch S4 of the No. 4 gas compressor C4 to stop the operation thereof. Accordingly, the five gas compressors No. 1 and No. 5 to No. 8 continue to be operated. The load factor at this time is 62.5% at the pressure level 5/8. 33.6 hours has elapsed.

Further, when the compressed air is not used, pressure rises, and the pressure level reaches the pressure level 4/8 (P6), a stoppage command signal from the control unit 9 is transmitted via the operation unit 12 to the electromagnetic switch S5 of the No. 5 gas compressor C5 to stop the operation thereof. Accordingly, the four gas compressors No. 1 and No. 6 to No. 8 continue to be operated. The load factor at this time is 50% at the pressure level 4/8. 42.5 hours has elapsed.

Further, when the compressed air is not used, pressure rises, and the pressure level reaches the pressure level 5/8 (P7), a stoppage command signal from the control unit 9 is transmitted via the operation unit 12 to the electromagnetic switch S6 of the No. 6 gas compressor C6 to stop the operation thereof. Accordingly, the three gas compressors No. 1, No. 7, and No. 8 continue to be operated. The load factor at this time is 37.5% at the pressure level 3/8. 47 hours has elapsed.

Further, when the compressed air is not used, pressure rises, and the pressure level reaches the pressure level 6/8 (P8), a stoppage command signal from the control unit 9 is transmitted via the operation unit 12 to the electromagnetic switch S7 of the No. 7 gas compressor C7 to stop the operation thereof. Accordingly, the two gas compressors No. 1 and No. 8 continue to be operated. The load factor at this time is 25% at the pressure level 2/8. 49 hours has elapsed.

Further, when the compressed air is not used, pressure rises, and the pressure level reaches the pressure level 7/8 (P9), a stoppage command signal from the control unit 9 is transmitted via the operation unit 12 to the electromagnetic switch S8 of the No. 8 gas compressor C8 to stop the operation thereof. Accordingly, only the gas compressor No. 1 continues to be operated. The load factor at this time is 12.5% at the pressure level 1/8. 51 hours has elapsed.

Further, when the compressed air is not used, pressure rises, and the pressure level reaches the pressure level 8/8 (P10), a stoppage command signal from the control unit 9 is transmitted via the operation unit 12 to the electromagnetic switch S1 of the No. 1 gas compressor C1 to stop the operation thereof. Accordingly, all the gas compressors stop. The load factor at this time is 0% at the pressure level 0/8. 53.6 hours has elapsed.

Stoppage of all the gas compressors continues while a state, in which the compressed air is used, the pressure level falls and does not reaches the pressure level 7/8, continues.

Next, when the compressed air is used and the pressure level falls and reaches the pressure level 7/8 (P11), a starting command signal from the control unit 9 is transmitted via the operation unit 12 to the electromagnetic switch S2 of the No. 2 gas compressor C2, which has stopped second, to begin the operation thereof. Accordingly, operation of the seven gas compressors No. 1 and No. 2 to No. 8 is stopped. The load factor at this time is 12.5% at the pressure level 1/8. 55 hours has elapsed.

Further, when the compressed air is used and the pressure level falls and reaches the pressure level 6/8 (P12), a starting command signal from the control unit 9 is transmitted via the operation unit 12 to the electromagnetic switch S3 of the No. 3 gas compressor C3, which has stopped third, to begin the operation thereof. Accordingly, operation of the six gas compressors No. 1 and No. 4 to No. 8 is stopped. The load factor at this time is 25% at the pressure level 2/8. 56 hours has elapsed.

Further, when the compressed air is used and the pressure level falls and reaches the pressure level 5/8 (P13), a starting command signal from the control unit 9 is transmitted via the operation unit 12 to the electromagnetic switch S4 of the No. 4 gas compressor C4, which has stopped fourth, to begin the operation thereof. Accordingly, operation of the five gas compressors No. 1 and No. 5 to No. 8 is stopped. The load factor at this time is 37.5% at the pressure level 3/8. 56.1 hours has elapsed.

Further, when the compressed air is used and the pressure level falls and reaches the pressure level 4/8 (P14), a starting command signal from the control unit 9 is transmitted via the operation unit 12 to the electromagnetic switch S5 of the No. 5 gas compressor C5, which has stopped fifth, to begin the operation thereof. Accordingly, operation of the four gas compressors No. 1 and No. 6 to No. 8 is stopped. The load factor at this time is 50% at the pressure level 4/8. 58.2 hours has elapsed.

Further, when the compressed air is used and the pressure level falls and reaches the pressure level 3/8 (P15), a starting command signal from the control unit 9 is transmitted via the operation unit 12 to the electromagnetic switch S6 of the No. 6 gas compressor C6, which has stopped sixth, to begin the operation thereof. Accordingly, operation of the three gas compressors No. 1, No. 7, and No. 8 is stopped. The load factor at this time is 62.5% at the pressure level 5/8. 60.9 hours has elapsed.

An average load factor L of the eight gas compressors $C_n$ (n=1 to 8) is found in the following manner by the formula (2) on the basis of data obtained from results of operation control of the gas compressors described above.

First, a total operating time S of a plurality of gas compressors incorporated in a gas compressor multiple system is S=(time in case of eight gas compressors being operated)×8+(time in case of seven gas compressors being operated)×7+(time in case of six gas compressors being operated)×6+(time in case of five gas compressors being operated)×5+(time in case of one gas compressor being operated)×1=58.4+81.9+87.6+60.0+28.8+9.3+6.2+3.6=319.7 hours.

An operating time T of the gas compressor multiple system is T=64−(time in case of all the eight gas compressors being stopped)=64−1.4=62.6 hours.

Accordingly, the average load factor L of the eight gas compressors $C_n$ (n=1 to 8) is calculated by the use of the formula (2) to make L=S/[P×T]=319.7/[8×62.6]≅0.638.

Therefore, an operating time M for management of time, at which maintenance of the gas compressor multiple system should be carried out, is calculated by the use of the formula (1) to make M=T (operating time of a gas compressor multiple system)×L (average load factor of a plurality of gas compressors)×C (safety factor)=62.6×0.638×C≅39.9×C.

Here, since it is general that C=1 to 1.3 is preferably adopted for the safety factor C, M≅39.9×1.2≅47.9 is obtained assuming that C=1.2.

That is, the operating time of the gas compressor multiple system is 62.6 hours but corresponds to 39.9 hours in view of the average load factor of the gas compressors, and dispersion involved in load factors of a plurality of gas compressors and safety are taken account of, so that it comes to a conclusion that the operating time M for management of time, at which maintenance of the gas compressor multiple system should be carried out, corresponds to 47.9 hours.

Accordingly, it suffices to carry out maintenance of the gas compressor multiple system when making a comparison between the operating time M=47.9 hours for management of time, at which maintenance should be carried out, and a predetermined time N for necessary maintenance, the value M meets a formula M≧N, or is substantially equal to the value N, that is, approximate to the value N. Since the time N for necessary maintenance is ordinarily in the order of 20,000 hours, it generally suffices to make a comparison between it and the value of M on the assumption of N=20,000 hours.

While the value of M is found by the formula (1) taking account of the safety factor C, it suffices to do in the following manner in the case where safety is to be further expected.

That is, an operating time is found with each of the gas compressors incorporated in the gas compressor multiple system, and it is recommended to carry out maintenance of the gas compressor multiple system presuming M≧N even when M<N, in the case where a maximum operating time t as found meets t≧N in relation to the predetermined time N for necessary maintenance.

Figure 3:
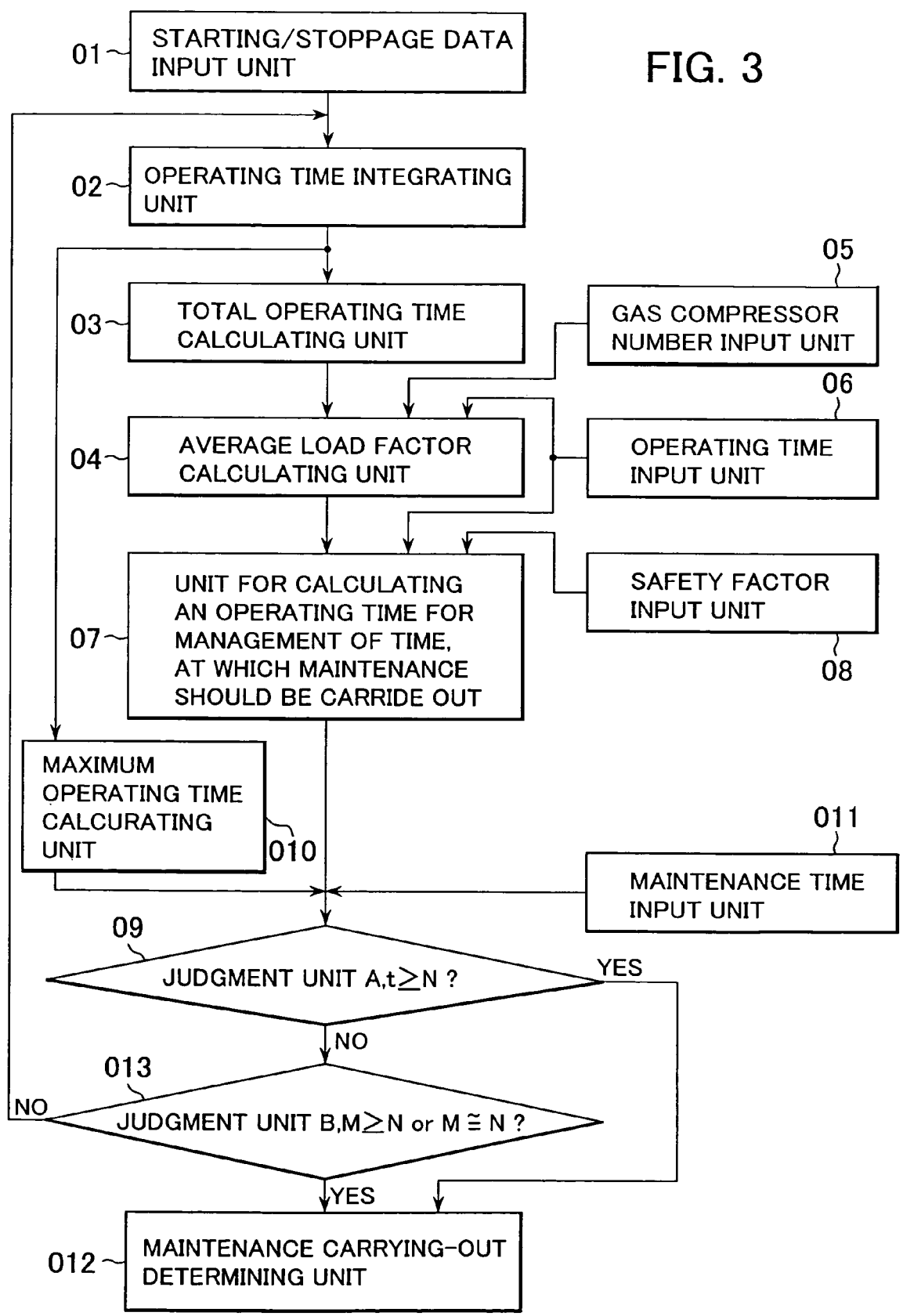
FIG. 3 is a flowchart in carrying out the invention with the use of a computer.

In order to embody the invention described above, a computer is made use of. FIG. 3 is a flowchart used in carrying out the invention with the use of a computer.

Starting/stoppage data for the respective gas compressors are transmitted to an operating time integrating unit 02 from a starting/stoppage data input unit 01. In the operating time integrating unit 02, an operating time is integrated every gas compressor on the basis of starting/stoppage data, results of which are transmitted to a total operating time calculating unit 03. In the total operating time calculating unit 03, a total operating time S of a plurality of gas compressors incorporated in the gas compressor multiple system is calculated, results of which are transmitted to an average load factor calculating unit 04.

The number P of the gas compressors incorporated in the gas compressor multiple system is transmitted to the average load factor calculating unit 04 from a gas compressor number input unit 05, an operating time T of the gas compressor multiple system is transmitted to the average load factor calculating unit from an operating time input unit 06, and an average load factor L of the plurality of gas compressors is calculated in the average load factor calculating unit 04, results of which are transmitted to a "unit 07 for calculating an operating time for management of time, at which maintenance should be carried out". Data of the safety factor C are transmitted to the "unit 07 for calculating an operating time for management of time, at which maintenance should be carried out" from a safety factor input unit 08, and an operating time M for management of time, at which maintenance of the gas compressor multiple system should be carried out, is calculated in the calculating unit 07, results of which are transmitted to a judgment unit A (09).

Meanwhile, results of integration of an operating time of each gas compressor are transmitted to a maximum operating time calculating unit 010 from the operating time integrating unit 02, and a maximum operating time t out of an operating time of each gas compressor is calculated in the maximum operating time calculating unit 010, results of which are transmitted to a judgment unit A(09). Time N for necessary maintenance is transmitted to the judgment unit A(09) from a maintenance time input unit 011.

In the judgment unit A(09), a comparison is made between a maximum operating time t out of an operating time of each gas compressor and a predetermined time N for necessary maintenance, and in the case where it is judged that the formula t≧N is met (in case of YES), a signal is transmitted to a maintenance carrying-out determining unit 012 irrespective of the size relationship between an operating time M for management of time, at which maintenance of the gas compressor multiple system should be carried out, and N, and so maintenance of the gas compressor multiple system is carried out.

On the other hand, in the case where it is not judged that the formula t≧N is met (in case of NO), a signal is transmitted to a judgment unit B(013). In the judgment unit B(013), a comparison is made between an operating time M for management of time, at which maintenance of the gas compressor multiple system should be carried out, and the predetermined time N for necessary maintenance, and in the case where it is judged that the formula M≧N or M≅N is met, a signal is transmitted to the maintenance carrying-out determining unit 012 and so maintenance of the gas compressor multiple system is carried out.

On the other hand, in the case where it is judged that neither the formulae M≧N nor M≅N are met, the procedure returns again to the operating time integrating unit 02 and thereafter calculation and judgment are performed likewise.

The foregoing merely relate to embodiments of the invention. Various changes and modifications may be made by a person skilled in the art without departing from the scope of claims wherein:

What is claimed is:

1. A method of managing time, at which maintenance in a gas compressor multiple system should be carried out, the method comprising using the formula (i) to find an operating time M for management of time:

$$M = T \times L \times C \tag{i}$$

where T is the operating time of a gas compressor multiple system, L is the average load factor of a plurality of gas compressors, and C is the safety factor, at which maintenance of the gas compressor multiple system incorporating therein a plurality of gas compressors should be carried out, and making a comparison between a value of M and a predetermined time N for necessary maintenance to carry out the maintenance when the value of M is larger than or substantially equal to a value of N, the average load factor L of the plurality of gas compressors being calculated by the formula (ii):

$$L = S/[P \times T] \qquad \text{(ii)}$$

where S is the total operating time of a plurality of gas compressors incorporated in a gas compressor multiple system, P is the number of gas compressors incorporated in a gas compressor multiple system, and T is the operating time of a gas compressor multiple system.

2. The method according to claim 1, further comprising finding an operating time for each of the gas compressors incorporated in the gas compressor multiple system, and carrying out maintenance of the gas compressor multiple system presuming $M \geq N$ even when $M < N$, in the case where a maximum operating time t out of the found operating time meets $t \geq N$ in relation to the predetermined time N for necessary maintenance.

3. The method according to claim 1, wherein operation control of the gas compressors is performed by a method, in which gas compressors having substantially the same capacity are used for the plurality of gas compressors incorporated, a range between predetermined lower and upper limit values of pressure is divided into pressure levels, the number of which is the same number as that of the gas compressors as used, the number of gas compressors being operated is changed when the pressure measurement signal gets out of a range of a target pressure level to reach a boundary of each pressure level, and starting and stoppage of the gas compressors keeping with such change are performed in a predetermined order of starting and stoppage, and a total operating time S of the plurality of gas compressors incorporated in the gas compressor multiple system, or an operating time of each gas compressor, is determined on the basis of data obtained as a result.

4. The method according to claim 3, wherein consecutive numbers are assigned to the plurality of gas compressors and starting and stoppage of the gas compressors are performed in the order of the consecutive numbers.

5. The method according to claim 1, wherein the safety factor C is 1 to 1.3.

* * * * *